United States Patent [19]
Guitian et al.

[11] Patent Number: 5,922,190
[45] Date of Patent: *Jul. 13, 1999

[54] PROCESS FOR SUPPRESSING FOAM FORMATION IN A BUBBLE COLUMN REACTOR

[75] Inventors: Jose Guitian, Yole, Venezuela; Daniel D. Joseph, Minneapolis, Minn.; Julio Krasuk, Caracas, Venezuela

[73] Assignee: Intevep, S.A., Caracas, Venezuela

[*] Notice: This patent is subject to a terminal disclaimer.

[21] Appl. No.: 08/725,485

[22] Filed: Oct. 4, 1996

[51] Int. Cl.$^6$ .................................................. B01D 19/02
[52] U.S. Cl. .......................... 208/46; 208/108; 208/112; 203/20; 95/155; 95/242
[58] Field of Search ........................ 95/155, 242; 203/20; 208/46, 108, 112

[56] References Cited

U.S. PATENT DOCUMENTS

| | | | |
|---|---|---|---|
| 4,851,107 | 7/1989 | Kretschmar et al. | 208/108 |
| 5,166,118 | 11/1992 | Kretschmar et al. | 502/185 |
| 5,169,560 | 12/1992 | Hart | 252/321 |

FOREIGN PATENT DOCUMENTS 3734011  4/1989  Germany.

*Primary Examiner*—Walter D. Griffin
*Attorney, Agent, or Firm*—Bachman & LaPointe, P.C.

[57] ABSTRACT

A process for suppressing foam formation in a bubble column reactor includes the steps of feeding a liquid and a gas to a reactor at a liquid velocity and a gas velocity respectively; and adding particles of a solid material to the liquid, wherein the particles are wettable by the liquid, and whereby foam formation in the reactor is suppressed

12 Claims, 4 Drawing Sheets

5,922,190

PROCESS FOR SUPPRESSING FOAM FORMATION IN A BUBBLE COLUMN REACTOR

BACKGROUND OF THE INVENTION

The invention relates to a process for suppressing foam formation in a bubble column reactor.

Bubble column reactors are typically a substantially vertical column into which are introduced a liquid and a gas which at reactor conditions are treated to obtain a desired product.

Foaming in chemical reactors, especially bubble column reactors, reduces the liquid volume available for desired reactions This is particularly well known in hydroconversion reactors, for example for hydrocracking of heavy crudes into light products such as naphthas and distillates. Also, foaming tendencies have been evident in coal liquefaction reactors of the bubble column type as in Fischer Tropsch reactors of certain types. A bubble column reactor which experiences foaming can result in up to 80% or more in the reactor volume being occupied by gas, and consequently at most only about 20% of the volume of the reactor is available for the desired conversion.

One known method for avoiding foaming is to add anti-foaming agents such as silicone oils, polyglycols and the like. However, these agents are cracked under the severe conditions present in the reactors. For example, in a hydrocracking reactor, anti-foaming agents are exposed to hydrogen pressures over 100 bar and temperatures of 140° C. or higher. Anti-foaming agents tend to crack into different chemical products which contaminate the liquid and gas in the reactor. In addition to requiring more frequent catalyst replacement in the downstream hydrodesulfurization reactors, such cracking of anti-foaming agents also tends to increase the operating costs of the overall process.

Frye and Berg, *J. Colloid Interface Sci.*, 127, (1), 222 (1989) have shown that non-wettable particles can be used to thin or reduce foam layers, and consequently reduce foam formation. According to Frye and Berg, the mechanism for accomplishing such foam thinning is related to capillary pressure Frye and Berg conclude that such capillary pressure considerations show that when a contact angle of the particle in the fluid is less than 90°, film rupture will not occur. Frye and Berg also indicate that for particles with continuous smooth shapes like spheres, discs, ellipsoids and rods, film rupture will occur only if the contact angle is greater than 90°.

The need remains for a process for suppressing foam which is effective without significantly increasing the cost of the process carried out in the bubble column reactor.

The need also remains for a process for reducing foam which does not result in additional materials added to the reactor which can be altered or cracked by the conditions in the reactor.

It is therefore the primary object of the present invention to provide a process for suppressing foam formation which is simple and inexpensive.

It is a further of the present invention to provide a process for suppressing foam formation which does not result in contamination of products from the reactors It is a still further object of the present invention to provide a process for foam suppression which can be employed in the hydroconversion reactor without requiring excessive additional materials Other objects and advantages of the present invention will appear hereinbelow

SUMMARY OF THE INVENTION

In accordance with the inventions the foregoing objects and advantages are readily attained.

According to the invention, a process is provided for suppressing foam formation in a bubble column reactor which comprises the steps of feeding a liquid and a gas to a reactor at a liquid velocity and a gas velocity respectively, and adding particles of a solid material to said liquid, wherein said particles are wettable by said liquid, whereby foam formation in said reactor is suppressed.

In further accordance with the invention, the particles preferably have a contact angle with the liquid less than or equal to about 90° so as to insure that the particles are wettable by the liquid In further accordance with the invention, a process is provided wherein the particles are selected having a particle size and particle density such that the particles are fluidized in the liquid without being entrained by either the gas or the liquid so that said particles are substantially homogeneously dispersed and mobile within said liquid.

BRIEF DESCRIPTION OF THE DRAWINGS

A detailed description of preferred embodiments of the present invention follows, with reference to the attached drawings, wherein.

DETAILED DESCRIPTION

The invention relates to a process for suppressing foam formation in a bubble column reactor.

Figure 1:
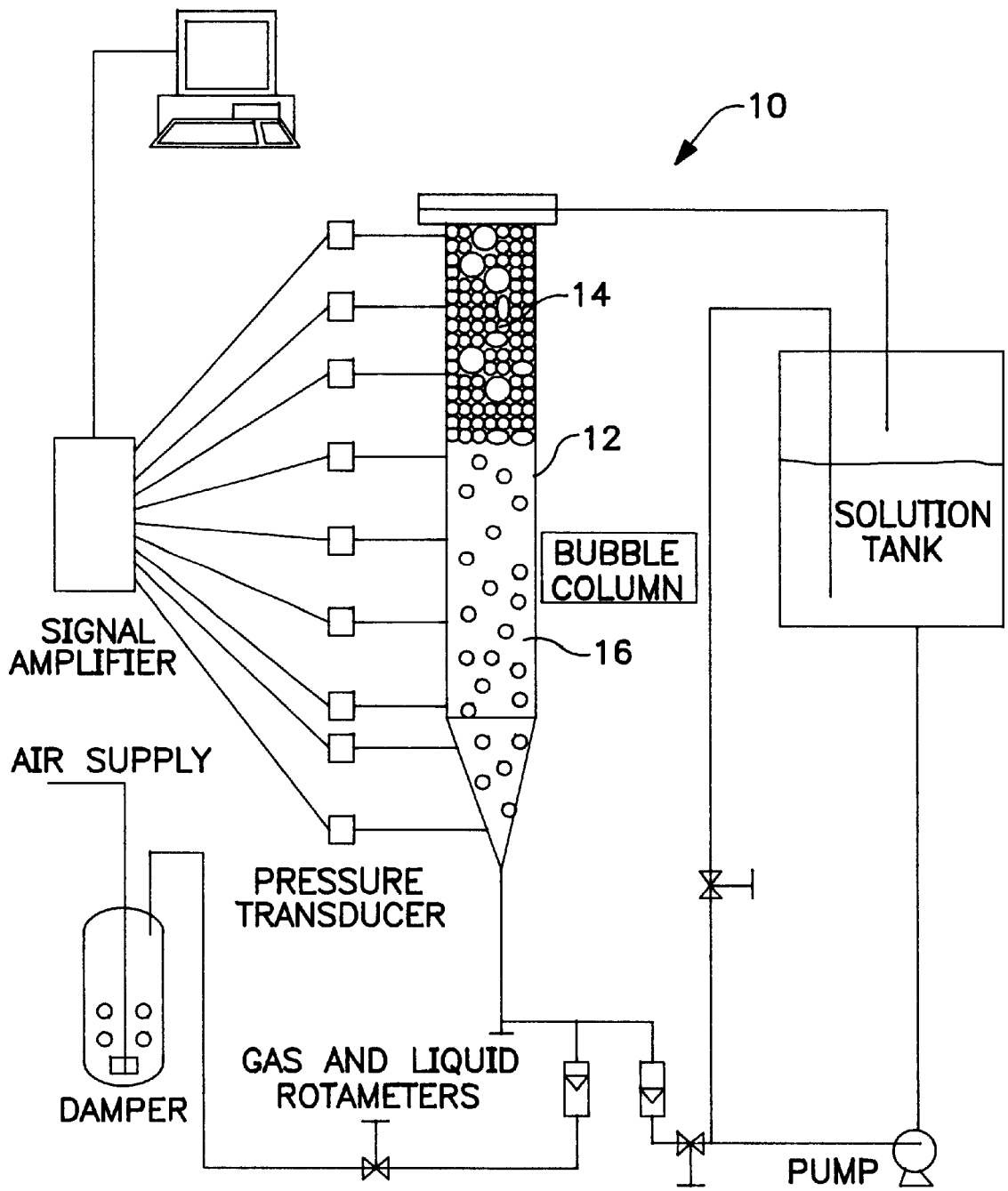
FIG. 1 is a schematic diagram of a bubble column reactor system.

FIG. 1 shows a schematic representation of a typical bubble column reactor 10 wherein gas and liquid are fed to a reaction chamber 12 at desired conditions to accomplish a desired reaction.

The gas and liquid are fed to reactor 10 at superficial gas and liquid velocities, respectively. Gas superficial velocity can typically be in the range of 0.1 cm/s to about 20 cm/s, while typical liquid superficial velocity is between about 0.1 to about 2 cm/s. Certain combinations of gas and liquid velocity lead to foaming characteristics which, as illustrated in FIG. 1, can lead to significant portions 14 of the internal volume of reactor 10 being filled with foam. As the volume of portions 14 filled with foam increases portions 16 of the volume in the reactor filled with liquid in which the desired reaction is carried out, decreases. This is undesirable because the efficiency of the process carried out in the reactor is decreased In accordance with the present invention, a process is provided wherein a solid particulate material is added to the liquid phase so as to suppress foam formation in the reactor. According to the invention, particles can be confined within the reactor for mixing with liquid upon feed to the reactor. Alternatively, particles can be added to liquid before feed to the reactor.

In accordance with the invention, it has been found that solid particles having certain characteristics are surprisingly effective at suppressing foaming in a bubble column reactor. According to the invention, solid particles are added to the liquid which particles are of a material selected to be wettable by the liquid in question. Suitable solid particles for use in accordance with the invention have been found to have a contact angle with the liquid in question of less than or equal to about 90°.

In further accordance with the invention, it is preferred that the solid particles have a particle size and particle density which are selected so as to provide particles which are fluidized in the liquid phase, without being entrained by either the liquid or gas phase, so that the particles are substantially homogeneously dispersed throughout the liquid phase without being carried into the foam phase of the reactor, or into the outlet portion of the reactor. This is desirable so that the solid particles circulate within the liquid phase in the reactor so as to attain maximum contact with the liquid phase without forming sedimentation in the bottom of the reactor, or potentially plugging or fouling the outlet of the reactor.

Depending upon reaction conditions and liquid the superficial liquid and gas velocity ($v_L$, $v_g$), liquid and gas viscosity ($\mu_L$, $\mu_g$) liquid and gas density, a particular system will have a minimum fluidization velocity ($U_{Lm}$), as well as a particle settling velocity in the gas phase ($V_{pmg}$) and a particle settling velocity in the liquid phase ($V_{pmL}$).

According to the invention, the particle size and density of the particles to be added are preferably selected so as to provide a minimum fluidization velocity ($U_{Lm}$) which is less than the desired liquid superficial velocity ($v_L$), and to provide a particle settling velocity in the liquid phase ($V_{pmL}$) which is greater than the superficial liquid velocity ($v_L$). Thus, the particle size and density are preferably selected so as to provide $U_{Lm} < v_L$; and $v_{pmL} > V_L$. This advantageously serves to cause the particles to expand the fluidized bed in a bubbly liquid mixture below the foam.

In further accordance with the invention, the particles are also preferably selected so as to provide a particle settling velocity in the gas phase which is greater than the superficial gas velocity in the reactor, in other words $v_g < V_{pmg}$.

In accordance with the foregoing particles having selected density and particle size will be fluidized, or substantially homogeneously dispersed throughout the liquid phase, without being entrained in significant portions into the foam and toward the outlet of the reactor. Further, fluidized particles advantageously circulate through the liquid providing an increase of liquid hold up and enhanced foam suppression.

It is preferred that particles according to the invention be added or mixed with the liquid phase in an amount of at least about 1% wt., preferably between about 1% to about 6% wt. based on liquid flow to the reactor.

In accordance with the invention, solid particles are preferably provided of a material selected from the group consisting of alumina, glass, coke, lignite, polytetrafluoroethylene, and iron oxide coated with coke, coal and mixtures thereof For a bubble column reactor to be used in hydroconversion reactions, it is particularly preferable in accordance with the present invention to provide solid particle material which also serves as a hydroconversion catalyst such as $Co/Mo/Al_2O_3$, $Ni/Mo/Al_2O_3$, $Ni/Co/Mo/Al_2O_3$, bauxite, limonite and the like which are effective as a catalyst for treating hydrocarbon liquid with hydrogen gas under hydroconversion conditions. Other examples, of suitable particles for use in accordance with the invention include glass particles and plastic particles, such as PVC, PEAD, PP and the like.

It has been found in accordance with the present invention that for typical hydrocarbon liquids and hydrogen as the gas phase, preferred solid particles have a particle diameter of between about 200 microns to about 1500 microns (1 mm), more preferably between about 500 microns to about 1000 microns, and preferably have a particle density of between about 1.5 to about 3.0 $g/cm^3$. These particles are found to advantageously provide minimum fluidization velocities as well as gas phase and liquid phase particle settling velocities which allow a broad range of gas and liquid superficial velocities which can be used during a process employing solid particles according to the invention to suppress foam.

As mentioned above, Frye and Berg have indicated that particles, for use in suppressing foam, must be non-wettable and have a contact angle greater than 90°. Thus, in accordance with the teachings of Frye and Berg, the solid particles of the present invention would not be believed to be effective in suppressing foam formation. However, it has been found in accordance with the present that the addition of particles selected as identified above to the liquid phase of a foaming bubble column reactor serves to significantly suppress foam formation therein, thereby advantageously providing an increased amount of reactor volume for liquids, thereby enhancing the efficiency of the overall process.

As set forth above, the material of the solid particles for use in accordance with the present invention is preferably selected so as to provide a material which is wettable by the liquid in question. Wettable materials exhibit a contact angle with the liquid, measured from the material, inside a droplet of the liquid to the liquid-gas boundary of the droplet, which is less than or equal to 90°. Glass and plastic particles were evaluated in several foaming systems to determine the contact angle. A water/sodium dodecyl sulphate (SDS) and a water/1 wt. % 1-pentanol/SDS system were each tested with glass and plastic (PVC) particles. Both types of particles exhibited contact angles significantly less than 90°, as set forth below in Table 1, thereby indicating that both materials are wettable by the foaming systems tested.

TABLE 1

| Glass | | | | Plastic (PVC) | | | |
|---|---|---|---|---|---|---|---|
| water/SDS | | water/1 wt % 1-pentanol/SDS | | water/SDS | | water/1 wt % 1-pentanol/SDS | |
| SDS (wt %) | cont. angle (°) | SDS (wt %) | cont. angle (°) | SDS (wt %) | cont. angle (°) | SDS (wt %) | cont. angle (°) |
| 0.0195 | 20 | 0.01 | 12 | 0.0195 | 67 | 0.01 | 36 |
| 0.0413 | 17 | 0.04 | 12 | 0.0317 | 39 | 0.02 | 34 |
| 0.0618 | 16 | 0.08 | 13 | 0.04 | 41 | 0.04 | 34 |
| 0.0989 | 15 | 0.2 | 16 | 0.0515 | 40 | 0.08 | 34 |
| 0.299 | 9 | — | — | 0.0618 | 40 | — | — |

A number of solid particulate materials were also tested for contact angle with various hydrocarbons, specifically Zuata crude, fuel oil No. 6, used motor luboil SAE 30, and motor luboil SAE 30. Various solids tested included alumina, glass, coke, lignite, polytetrafluoroethylene, and oxide particles coated with coke. The contact angle exhibited by each of these materials for each hydrocarbon is listed below in Table 2.

TABLE 2

| SOLIDS | CONTACT ANGLE (°) | | | |
|---|---|---|---|---|
| | ZUATA CRUDE | FUEL OIL NO. 6 | USED MOTOR LUBOIL SAE 30 | MOTOR LUBOIL SAE 30 |
| Alumina | 56 | 16 | 24 | 20 |
| Glass | 53 | 27 | 23 | 16 |
| Coke | 38 | 24 | 26 | 15 |
| Lignite | 51 | 23 | 20 | 19 |
| Polytertafluoro-methylene | 38 | 24 | — | — |
| Iron Oxide coated x/coke | 42 | 30 | 27 | 12 |

As shown above, each of these materials is a suitable material for use as solid particle additive with the identified liquid in accordance with the present invention.

EXAMPLE 1

In this example, the effect of addition of solid particles according to the invention to foaming and non-foaming systems is demonstrated.

Figure 2:
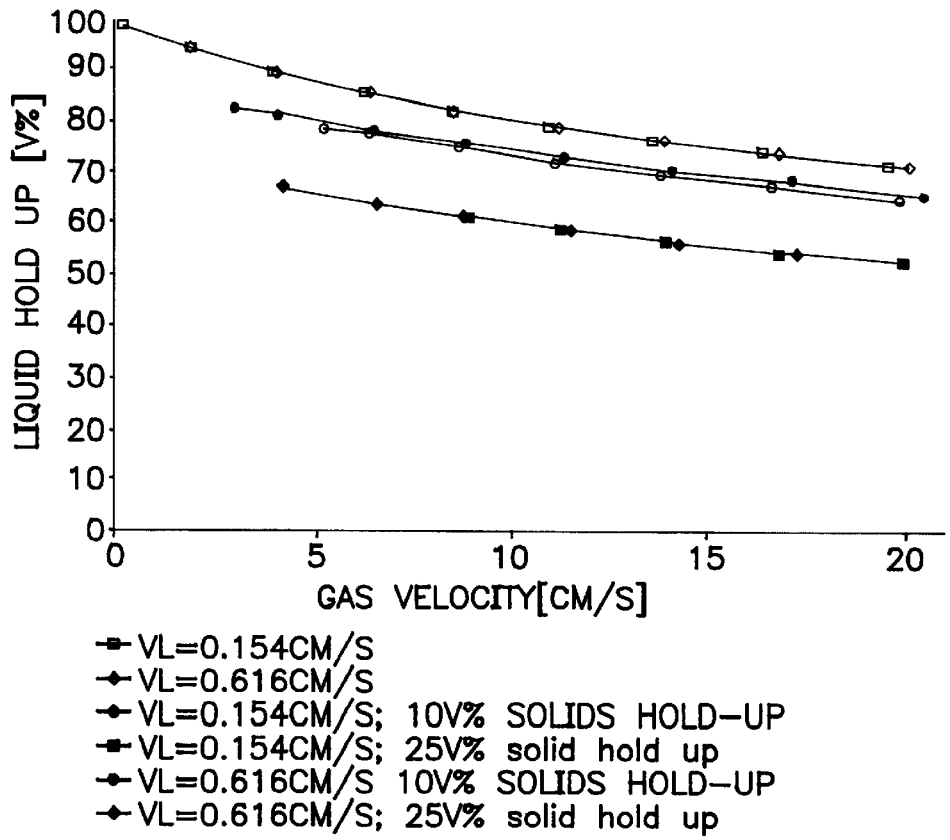
FIG. 2 illustrates liquid hold-up for a non-foaming system treated with solid particles.

A system having distilled water as the liquid was used. Glass particles having an average diameter of 532 microns were added to the liquid of the system at varying amounts and liquid and gas velocities all of which were non-foaming. FIG. 2 shows the results of these tests in terms of liquid hold up or liquid volume percentage in the reactor. As shown, for non-foaming systems, solid particles actually reduced the liquid hold up, thereby indicating that the solid particles of the present invention are not useful for non-foaming systems.

EXAMPLE 2

Figure 3:
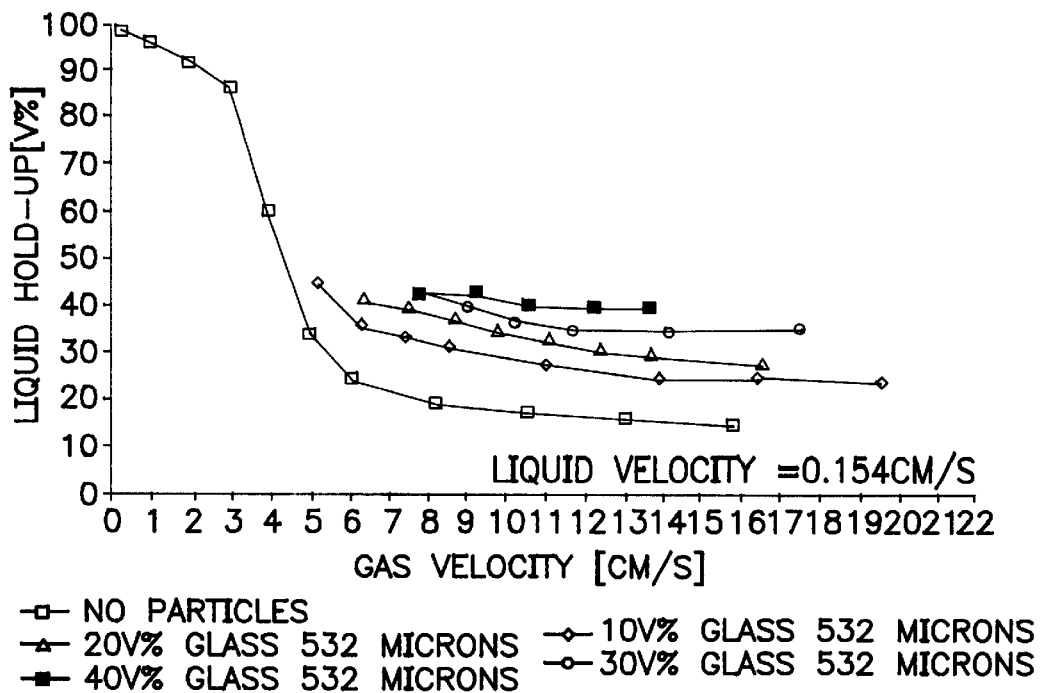
FIG. 3 illustrates liquid hold-up for a foaming system treated with particles according to the invention, at a low liquid superficial velocity.
Figure 4:
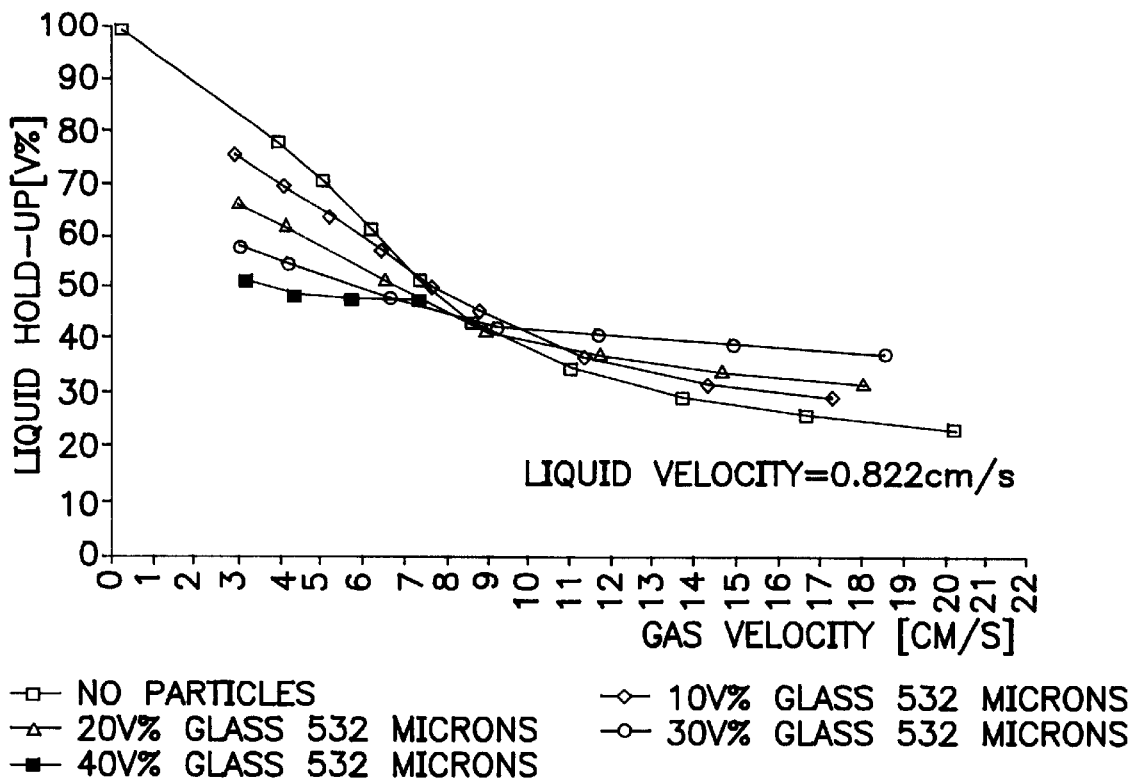
FIG. 4 illustrates liquid hold-up for a foaming system treated according to the invention, at a higher liquid superficial velocity.

This example demonstrates the effective suppression of foaming using solid particles according to the invention on a foaming system A system was tested using a foaming (water/1 wt % 1-pentanol) system and the same glass particles of Example 1. At a liquid velocity of 0.154 cm/s and varying gas velocities, the glass particles were added to the liquid and liquid hold up or volume % in the reactor were determined. FIG. 3 shows that the system with no particles foamed and liquid hold up dropped to less than 20%. Systems treated with the solid particles according to the invention exhibited significantly higher liquid hold up values, and thereby exhibited suppressed tendency to foam. To further illustrate the effect of using the solid particles in foaming systems as opposed to non-foaming systems, further tests were run using the same glass particles and increasing gas velocity from low values with no foaming to higher values which do create a foaming system. FIG. 4 shows values of liquid hold up obtained for the various gas velocities and additions of solid particles. As shown, up to about 9 cm/s gas velocity, the system is non-foaming and addition of solid particles does not provide beneficial results. At gas velocity higher than 9 cm/s, however, addition of solid particles according to the invention shows clear increases in liquid hold up as desired.

EXAMPLE 3

Figure 5:
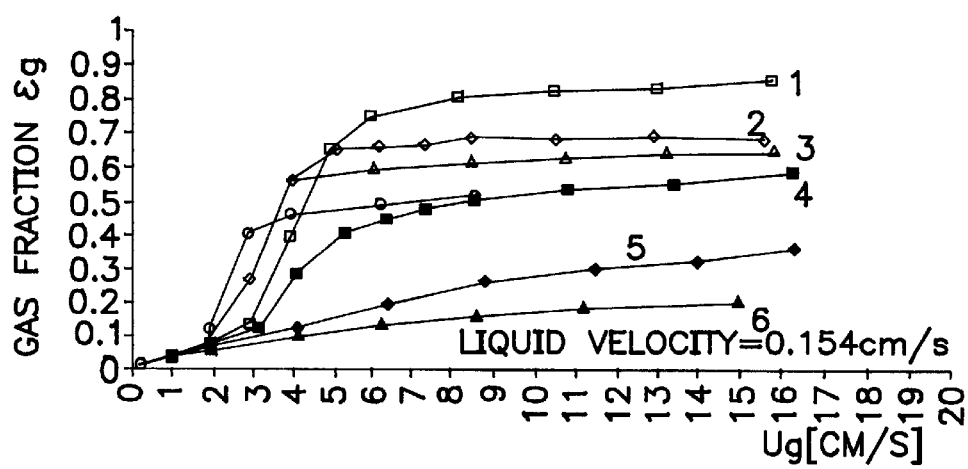
FIG. 5 illustrates the effect of particle size on the gas fraction of a system treated according to the invention.
Figure 6:
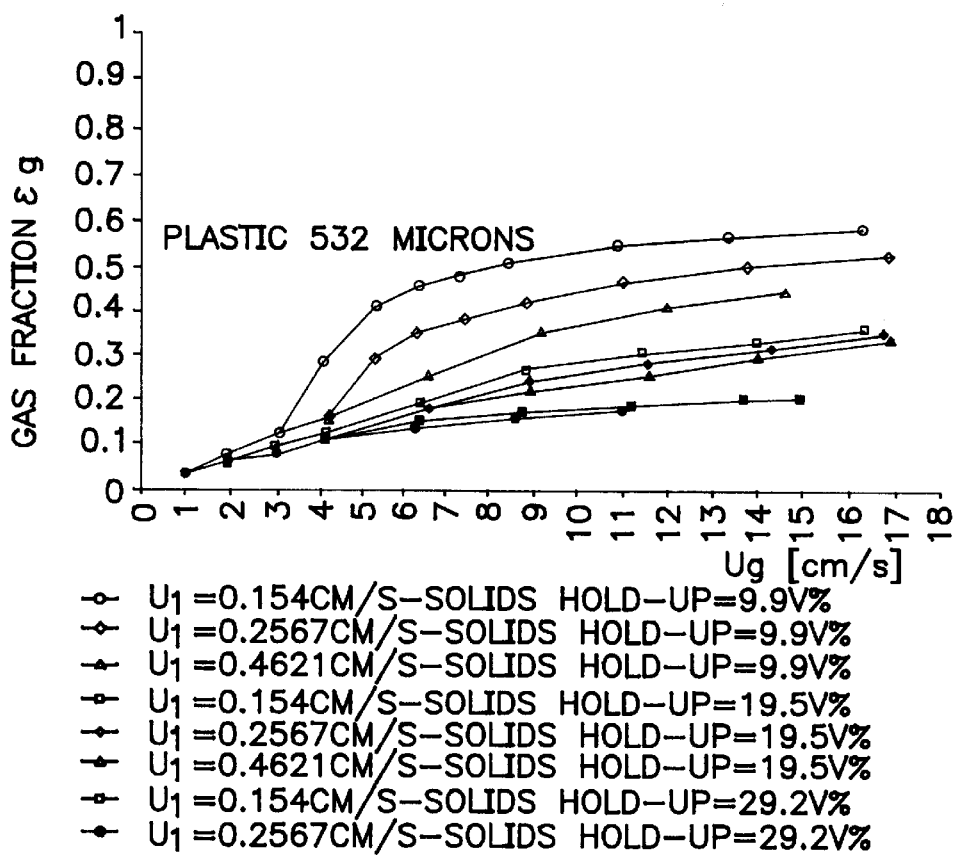
FIG. 6 further illustrates the gas fraction of a foaming system treated according to the invention.

In this example, similar results are obtained using plastic particles in accordance with the present invention. The results of these tests also show that as the surface area of solid particles according to the invention increases, better results are obtained. Plastic (PVC) particles were added in varying amounts and sizes to the same foaming system of Example 2 above. FIG. 5 shows the results of the tests for varying gas flow velocities and particle surface area. In FIG. 5, the numbered plots are as follows: (1) no particles, (2) 10V % 1068 $\mu$m (area 5.6 cm$^2$/cc), (3) 20 v % 1068 $\mu$m, (area 11.2 cm$^2$/cc), 20 V % 1068 $\mu$m (area 16.9 cm$^2$/cc), (4) 9.9 V % 532 $\mu$m (area 11.2 cm$^2$/cc), (5) 19.5 V % 532 $\mu$m (area 16.9 cm$^2$/cc), (6) 29.2 V % 532 $\mu$m (area 32.9 cm$^2$/cc). As shown, the gas fraction in the reactor was highest for this foaming system when no particles were added, and best results were obtained with plastic particles having a surface area of 32.9 cm$^2$/cc. FIG. 6 shows results of additional tests run using plastic particles having an average particle diameter of 532 microns, at varying gas and liquid velocities and different amounts of solids. As shown, within the ranges tested, higher amounts of solids resulted in reduced gas fraction % within the reactor.

EXAMPLE 4

Figure 7:
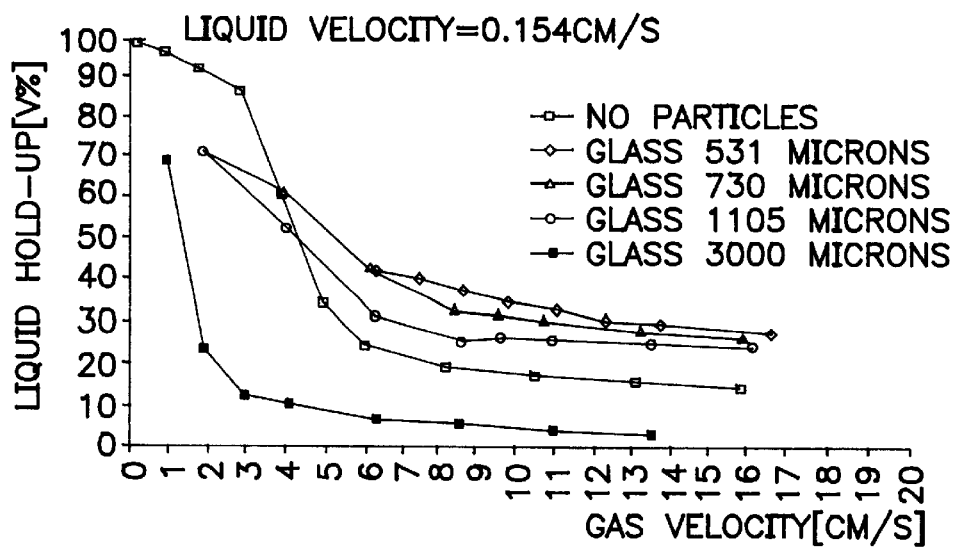
FIG. 7 illustrates the effect of particle size on liquid hold-up of a system treated according to the invention.

This example further illustrates the advantageous effects of adding particles of selected size in accordance with the invention. A foaming system of (water/1 wt % 1-pentanol/0.04 wt % SDS) was tested at varying gas velocities and a liquid velocity of 0.154 cm/s using no particles, and using 20% by volume of particles having particle sizes of 531, 730, 1105 and 3000 microns. The results are shown in FIG. 7. As shown, particles having diameters between about 500 to about 1000 microns showed beneficial increase of liquid hold up values as opposed to using no particles. However, the 3000 micron particle size resulted in a decrease in liquid hold up. Table 3 below shows the relation of minimum liquid fluidization velocity ($U_{LM}$) with the liquid and gas velocity for each particle size. $U_{LM}$ values were estimated by Song's correlation (Fan, L. S., "Gas-Liquid-Solid Fluidization Engineering", Butterworths, 1989, p. 42–43).

TABLE 3

| particle size (microns) | liquid velocity $v_L$ (cm/s) | gas velocity $v_g$ (cm/s) | minimum liquid fluidiz'n velocity $U_{Lm}$ (cm/s) | fluidiz'n observed |
|---|---|---|---|---|
| 531 | 0.154 | 6.0 | 0.15 | yes |
| 531 | 0.154 | 10.0 | 0.10 | yes |
| 531 | 0.154 | 16.0 | 0.092 | yes |
| 1105 | 0.154 | 6.0 | 0.81 | partial |
| 1105 | 0.154 | 10.0 | 0.52 | partial |
| 1105 | 0.154 | 16.0 | 0.46 | partial |
| 3000 | 0.154 | 6.0 | 16.9 | no |
| 3000 | 0.154 | 10.0 | 8.8 | no |
| 3900 | 0.154 | 13.0 | 8.1 | no |

As shown, fluidization was observed when the liquid velocity was greater than the minimum liquid fluidization velocity. Thus, the 3000 micron particles which in this system do not fluidize also did not provide beneficial results as shown in FIG. 7, thereby demonstrating that fluidization of particles according to the invention clearly provides beneficial reduction or suppression of foaming and increased liquid hold up or volume in the reactor as desired.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for suppressing foam formation in a bubble column reactor, comprising the steps of:

feeding a liquid and a gas to a reactor at a liquid velocity and a gas velocity respectively; and adding particles of a solid material to said liquid, said particles having a particle size and particle density such that said particles are fluidized in and homogeneously dispersed through said liquid at said liquid velocity, wherein said liquid velocity is between about 0.1 cm/s to about 2.0 cm/s, said gas velocity is between about 0.1 cm/s to about 20 cm/s, said particles have a particle diameter of between about 200 to about 1500 microns and said particles are added in an amount of between about 1% to about 6% by weight based on the liquid flow to the reactor, wherein said particles are wettable by said liquid, whereby foam formation in said reactor is suppressed.

2. A process according to claim 1, wherein said particles have a contact angle with said liquid of less than or equal to about 90°.

3. A process according to claim 1, wherein said particle size and said particle density are selected so as to provide a minimum liquid fluidization velocity which is less than said liquid velocity, whereby said particles are fluidized in said liquid.

4. A process according to claim 1, further comprising selecting said particle size and said particle density so as to provide a liquid phase particle settling velocity which is greater than said liquid velocity, whereby said particles are not entrained by said liquid.

5. A process according to claim 3, further comprising selecting said particle size and said particle density so as to provide a liquid phase particle setting velocity which is greater than said liquid velocity, whereby said particles are not entrained by said liquid.

6. A process according to claim 1, further comprising the step of confining said particles within said reactor whereby said adding step is carried out by feeding said liquid to said reactor.

7. A process according to claim 1, wherein said adding step comprises adding said particles to said liquid before feeding said liquid to said reactor.

8. A process according to 1, wherein said particles are particles of a material selected from the group consisting of plastic, glass and combinations thereof.

9. A process according to claim 1, wherein said liquid is hydrocarbon and said particles are particles of a material selected from the group consisting of alumina, glass, coke, lignite, polytetrafluoroethylene, iron oxide coated with coke, coal, and mixtures thereof.

10. A process according to claim 1, wherein said liquid is a hydrocarbon and said gas is selected from the group consisting of hydrogen, carbon monoxide, synthesis gas, and mixtures thereof, and further comprising subjecting said liquid and said gas to hydroconversion or synthesis conditions.

11. A process according to claim 10, wherein said particles are particles of a hydroconversion catalyst.

12. A process according to claim 11, wherein said hydroconversion catalyst is selected from the group consisting of $Co/Mo/Al_2O_3$, $Ni/Mo/Al_2O_3$, $Co/Ni/Mo/Al_2O_3$ and mixtures thereof.

* * * * *